Feb. 23, 1932. W. H. SMITH 1,846,530
PROCESS OF REDUCING IRON ORE WITHOUT MELTING
Filed Nov. 28, 1928

INVENTOR.
William H. Smith
BY
Stuart C. Barnes
ATTORNEY.

Patented Feb. 23, 1932

1,846,530

UNITED STATES PATENT OFFICE

WILLIAM H. SMITH, OF DETROIT, MICHIGAN, ASSIGNOR TO GENERAL REDUCTION CORPORATION, OF DETROIT, MICHIGAN, A CORPORATION OF DELAWARE

PROCESS OF REDUCING IRON ORE WITHOUT MELTING

Application filed November 28, 1928. Serial No. 322,378.

This invention relates to a process of reducing iron ore without melting. It has to do particularly with a specific process for controlling the reduction of $Fe_2O_3$ to $Fe_3O_4$; $Fe_3O_4$ to $FeO$; and $FeO$ to $Fe$, considering $CO$ as a reducing agent.

Many attempts have heretofore been made toward the reduction of iron ore without melting, and while reduced iron or sponge iron has been obtained, such product has been of a relatively poor quality, and even with such quality as has been obtained, the results have varied considerably. Probably the chief reason for previous failures to obtain continuous, complete reduction of iron ore and a constant uniformity of quality, has been due to the failure of subjecting the streams of iron ore to limited, well defined reducing zones, and to a lack of maintaining a predetermined constant temperature at such zone.

The present invention, in general, may utilize a method and apparatus wherein the retorts are formed in a long bank of ovens, the ore fed in continuous, narrow streams, and the heat applied internally between successive streams of ore, but it relates to a more specific process for accurately controlling the continuous reduction of iron ore to sponge iron utilizing $CO$ as a reducing agent.

I have found that the reduction of iron ore to sponge iron takes place most efficiently and most effectively by maintaining three distinct, positive, and separate zones to control the separate successive reductions of the iron ore to pure reduced iron. I have further discovered that there is a direct equilibrium between the temperature of reduction of the iron oxides and the relative percentage of $CO$ and $CO_2$, and that by maintaining such equilibrium in correct proportions at the distinct, positive zones, I am able to accurately control within very narrow limits the uniform, complete reduction of the iron oxides to the reduced iron.

Figures 1, 2:
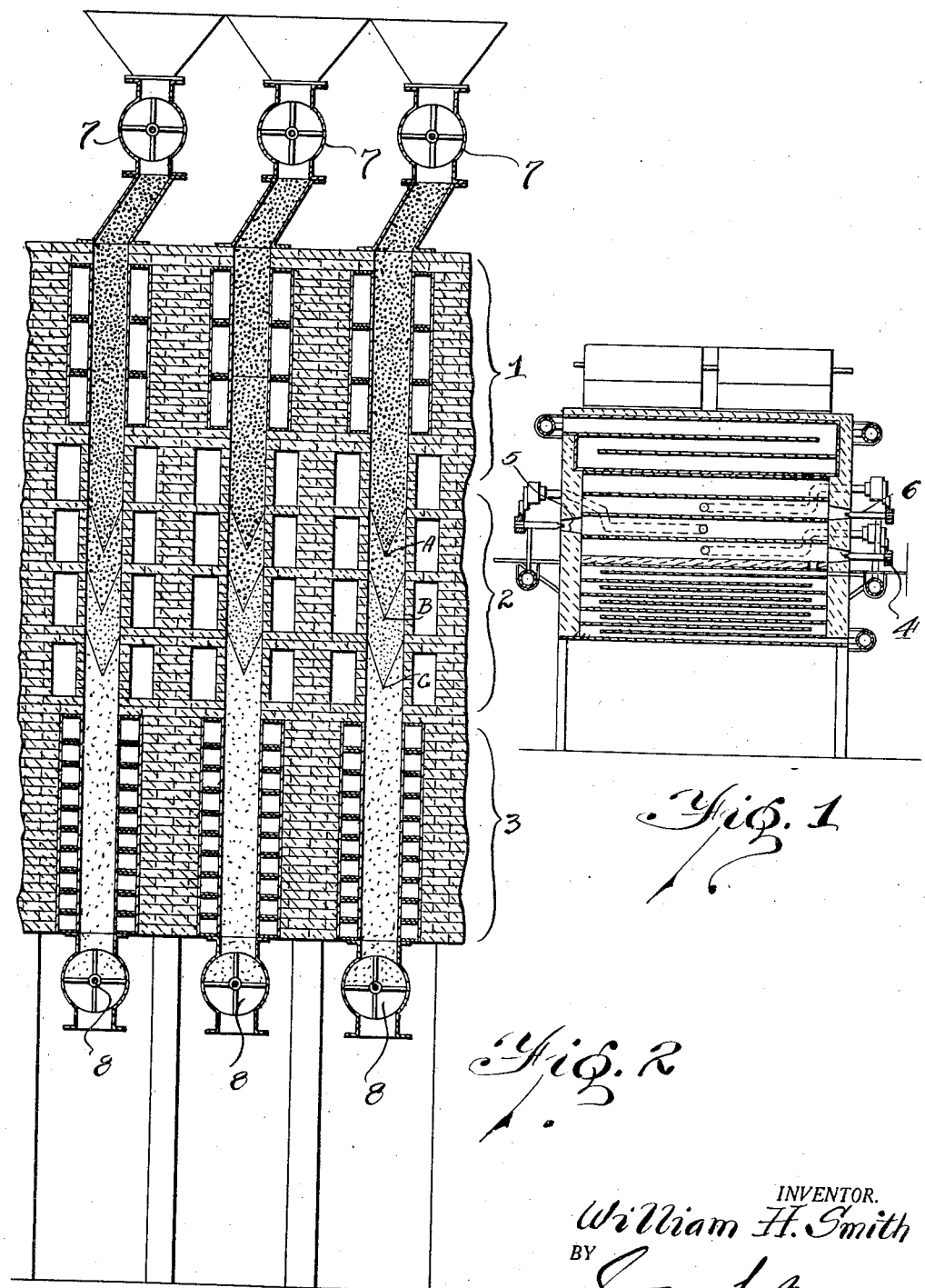
Fig. 1 is a vertical section taken transversely through one of the heating units which is positioned between two streams of ore, and illustrating one method of accurately controlling the application of heat to three separate zones.
Fig. 2 is a longitudinal, vertical, sectional view taken longitudinally of the bank of ovens, and illustrating a method of providing and maintaining three separate zones for reducing the iron oxide to pure iron.

Figs. 1 and 2 are merely for the purpose of illustrating one method of carrying out applicant's process. In Fig. 2 the apparatus is so constructed that the retort is divided into a preheating zone 1, a reducing zone 2, and a cooling zone 3, and the reducing zone 2 is in turn divided into three zones, A, B, and C. The present invention relates mainly to the provision and the maintenance of said three zones, A, B, and C, and the process of controlling the reduction of ore in said three zones.

Fig. 1 is a section taken through one of the heating flues, as shown in Fig. 2, and for the purpose of the present invention, attention is particularly directed to the three burners, 4, 5, and 6, which are so inserted at predetermined points as to accurately control the heating of the specific zones A, B, and C. Obviously, other means of heating may be provided, such as electrical resistance units, but such adjustable burner elements 4, 5, and 6, have been found practical and sufficient for carrying out the present process.

In carrying out my process, iron oxide, preferably $Fe_2O_3$ is fed into the top hopper of each retort and is continually fed through each retort by means of the valve members 7 and 8 at the top and bottom of each retort. This iron oxide is preferably mixed with a surplus amount of carbon and fed as a mixture down through each retort. The carbon may be present in any one of several different forms.

The heat in the top zone 1, which is preferably derived either from the cooling zone 3 or from the reducing zone 2, is sufficient to preheat the down-moving mixture. The zones A, B, and C are maintained at a constant predetermined temperature to accomplish the reducing of the iron oxide as will be later described. Such zones, A, B, and C, of course, may be varied according to the quality of ore and reducing agent used and according to the quality of reduction desired, the point being, however, that for a particular grade of iron oxide, a particular rate of movement through the retort, and for a particular reduction desired, such zones will be maintained at a constant predetermined temperature. Furthermore, as will be later described, I have found that each zone, A, B, and C, requires a different amount of heat units for effecting the complete reduction step in each particular zone.

I have discovered that the reduction of iron oxide $Fe_2O_3$ to Fe is best accomplished by carrying out such reduction in three distinct zones whereby the $Fe_2O_3$ is first changed to $Fe_3O_4$, next to FeO, and then to Fe, and that such changes are preferably accomplished within certain predetermined ranges of temperature and in the presence of a certain predetermined percentage of CO relative to $CO_2$. Of course, if the iron oxide available is $Fe_3O_4$ instead of $Fe_2O_3$, the first zone would then be the preheating zone which would bring the temperature of the $Fe_3O_4$ up to the correct point for changing the same to FeO.

I have discovered that the preferred temperature for reducing $Fe_2O_3$ to $Fe_3O_4$ is up to 500° C. in the presence of ascending carbonaceous and/or hydrogen gases from the two lower zones B and C. I have found also that the preferred temperature for reducing $Fe_3O_4$ to FeO is from 500 to 700° C., largely utilizing the ascending gases from zone C to zone B at a predetermined ratio varying from approximately 30% CO and 70% $CO_2$ to 60% CO and 40% $CO_2$. I have furthermore discovered that the preferred temperature to be maintained in zone C varies between 700° C. and 1100° C., and that the ratio of CO to $CO_2$ in this field varies from approximately 60% CO to approximately 95% CO.

I have still further discovered that of the total reduction heat supplied to the zones A, B, and C, in the present process, that practically 60% is utilized in zone C for carrying out the reduction of FeO to Fe; approximately 22% is required in reduction of $Fe_2O_3$ to $Fe_3O_4$, and that approximately 18% is required in the reduction of $Fe_3O_4$ to FeO. It will thus be obvious that it is not only necessary to maintain the three zones at three distinct temperatures, but that it is also necessary to so control the supply of heat units so that the greater supply will be constantly available in zone C to carry out the final reduction to sponge iron.

It will thus be seen that I have discovered that in the continuous reduction of iron oxide to iron by moving the same in a continuous stream in the presence of a reducing agent such as CO, that three distinct reducing zones should be maintained, and that in each zone the efficient reduction may be only carried out within specified limits; that is, as to temperature and percentage of CO and $CO_2$ present; and that furthermore the supply of heat units to such three zones must be varied in accordance with the reduction taking place in said zones. Of course it will be understood that the temperatures and percentages of CO and $CO_2$ in each zone may overlap slightly as to the ranges above given, but it will be understood that such ranges and temperatures given cover the general field in which each reduction should take place.

It will be understood that the CO or the CO and $CO_2$ may be supplied from other sources and by other means, than by adding the carbon with the ore at the top of each retort, and it will be furthermore understood that various means may be provided for conveying away certain gases at predetermined points in each retort; however, this last structure is of no particular moment in the present case.

It will be understood that in the carrying out of my preferred process, the greater portion of the reaction takes place in zone C where the C coacts with the O of the FeO to form $CO_2$, which immediately in the presence of the excess C and the predetermined temperature in zone C, forms CO. This CO further reduces the FeO and also passes up to zones B and A in the correct percentages sufficient to reduce the iron ore in accordance with the temperature and heat units present as above described.

In other words, while I have found that the percentage of CO in zones A, B, and C, as above set forth, should be maintained, it will be understood that if 90% production of CO is maintained in zone C that approximately 60% of this will be utilized in reducing the FeO to Fe in zone C, 22% in zone B, and 18% in zone A.

It will be further understood that if desired, the flow of gases may be reversed to that of the preferred process above described; that is, instead of supplying the greater percentage of heat units in zone C, thus initially forming the relatively correct percentage of CO which passes to the upper zone, some of which changes to $CO_2$ with an exothermic action and thus producing internal heat, I increase the percentage of heat units supplied to zones A and B and form the necessary and relatively small percentage of CO in zones A and B. In this case some of the CO and $CO_2$ formed in the zone A will pass down to zone B and the heat units supplied in this zone increased to form the relatively greater portion of CO and $CO_2$, to complete reaction in this zone. Some CO and $CO_2$ will then pass downward to zone C while under the higher temperature and the presence of excess carbon, the $CO_2$ present will be changed to CO to obtain the relatively high percentage of CO required in this final reducing zone. This complete downward action in the three zones will be an endothermic action and will require the supplying of more heat units than my previously described preferred process. However, in this latter process CO gas may be taken off at zone C and utilized and any such CO gas in zone C will be of a greater amount and better quality than the CO which would be obtained in zone A, as a result of the first process described.

What I claim is:

1. The process of reducing iron ore in the presence of CO, which consists in substantially continually moving a charge of iron oxide and carbon through a main reducing zone divided into a plurality of reducing sub-zones, independently maintaining each sub-zone at a fixed predetermined but increased temperature and supplying a different but predetermined number of heat units sufficient to complete the reaction and reduction at each particular subzone.

2. The process of reducing iron ore in the presence of CO, which consists in substantially continually moving a charge of iron oxide and carbon through preheating, reducing and cooling zones, the reducing zone being divided into a plurality of positively defined subreducing zones to successively reduce the iron oxide, maintaining a predetermined proportion of CO and $CO_2$ in each zone and maintaining a different predetermined and independently controlled temperature in each zone corresponding to the proportion of CO and $CO_2$.

3. The process of reducing iron ore in the presence of CO, which consists in substantially continually moving a charge of iron oxide and carbon through a plurality of positively defined reducing zones to successively reduce the iron oxide, maintaining a predetermined proportion of CO and $CO_2$ in each zone, maintaining a different predetermined and independently controlled temperature in each zone corresponding to the proportion of CO and $CO_2$, and independently controlling the amount of heat units supplied at each predetermined temperature.

4. The process of reducing iron ore with carbon, which comprises mixing iron oxide in the form of $Fe_2O_3$ and carbon, substantially continually feeding the mixture in an enclosed retort through a main reducing zone divided into three contiguous but independently controlled reducing zones, the first zone being only of sufficient temperature to reduce the $Fe_2O_3$ to $Fe_3O_4$ in the presence of gases rising from lower zones, the second zone being maintained at a temperature only sufficient to substantially reduce the $Fe_3O_4$ to FeO in the presence of a predetermined percentage of CO, and the third zone being maintained at a substantially constant temperature, sufficient to reduce the FeO to Fe in the presence of a predetermined percentage of CO.

5. The process of reducing iron ore with carbon, which comprises mixing iron oxide in the form of $Fe_2O_3$ and carbon, substantially continually feeding the mixture in an enclosed retort through three contiguous but independently controlled reducing zones, the first zone being only of sufficient temperature to reduce the $Fe_2O_3$ to $Fe_3O_4$ in the presence of gases rising from lower zones, the second zone being maintained only at a temperature sufficient to reduce the $Fe_3O_4$ to FeO in the presence of a predetermined percentage of CO, and the third zone being maintained at a substantially constant temperature, sufficient to reduce the FeO to Fe in the presence of a predetermined percentage of CO, and then cooling the reduced iron in the presence of surplus carbon and expelling the same from the retort in the form of sponge iron.

6. The process of reducing iron ore, which comprises maintaining a substantially continuous stream of iron oxide, passing such stream of iron oxide through a positively defined zone maintained at substantially 700° C. to 1100° C., maintaining a surplus supply of reducing agent in the form of carbon and sufficient heat units at said zone to form and maintain a supply of CO relative to $CO_2$ of from 60% to 95%, maintaining a second zone above said first zone at substantially 500° to 700° C. and maintaining a percentage of CO relative to $CO_2$ in said second zone of approximately 30% to 60%.

7. The steps in the process of reducing iron ore, which comprises maintaining a substantially continuous stream of iron oxide, passing said stream of iron oxide through a main reducing zone divided into a plurality of positively defined zones one of which is maintained at substantially 700° C. to 1100° C., and supplying constantly maintained but a different quantity of heat units to each zone.

8. The process of reducing iron oxides to iron in the presence of carbon, which comprises dividing the main reducing zone into a plurality of distinctly separate sub-reducing zones, maintaining one of said positively defined zones at a predetermined temperature to maintain an equilibrium between the CO and $CO_2$ whereby the percentage of CO in said zone will be between 60% and 95%, maintaining a second positively defined zone above the first mentioned zone at a distinctly lower and predetermined temperature to maintain an equilibrium between CO and $CO_2$ in the second zone of between 30% and 60%, and passing the charge of iron oxide and carbon successively through said positively defined zones maintained at predetermined but different temperatures.

9. The process of reducing $Fe_2O_3$ to Fe in three distinct steps which comprises, maintaining three separate zones and three distinct temperatures in each zone, subjecting a charge of iron oxide and carbon successively to the three distinct zones, maintaining the temperature of the third zone sufficient to create and maintain a gaseous atmosphere of from 60% to 95% CO, maintaining the temperature of the second zone such that a gaseous atmosphere of from 30% to 60% CO is maintained, the $Fe_2O_3$ being reduced to $Fe_3O_4$ in the first zone, the $Fe_3O_4$ being reduced to FeO in the second zone and the FeO being reduced to Fe in the third zone, a portion of the CO in the third zone being utilized to reduce the FeO to Fe and a portion passing upwardly to assist in the reduction in the second zone.

10. The process of reducing $Fe_2O_3$ to Fe in three distinct steps, which comprises maintaining three distinct reducing zones through which iron oxide and carbon pass, the iron oxide being reduced to FeO in the second zone, maintaining the temperature of the third zone such that the FeO is reduced to Fe in the presence of carbon and a gaseous atmosphere containing between 60% and 95% CO, maintaining the production of this percentage of CO and utilizing a portion of the same in the final reduction of the iron oxide, and then passing a portion of said CO up to the other zones to assist in the reduction in said zones.

In testimony whereof I affix my signature.

WILLIAM H. SMITH.